No. 646,060. Patented Mar. 27, 1900.
H. STRACHE.
VALVE FOR WATER GAS GENERATORS.
(Application filed July 21, 1899.)
(No Model.)

Witnesses:
Hugo Böhme

Inventor:
Hugo Strache
by: Eustace H. Hopkins
Att'y.

UNITED STATES PATENT OFFICE.

HUGO STRACHE, OF VIENNA, AUSTRIA-HUNGARY.

VALVE FOR WATER-GAS GENERATORS.

SPECIFICATION forming part of Letters Patent No. 646,060, dated March 27, 1900.

Application filed July 21, 1899. Serial No. 724,698. (No model.)

*To all whom it may concern:*

Be it known that I, HUGO STRACHE, a subject of the Emperor of Austria-Hungary, and a resident of Vienna, Empire of Austria-Hungary, have invented certain new and useful Improvements in Stop-Valves for Water-Gas Generators, of which the following is a full, clear, and exact description.

The present invention relates to stop-valves for water-gas generators; and it consists of the details of construction hereinafter set forth, and particularly pointed out in the claims.

Figure 1:
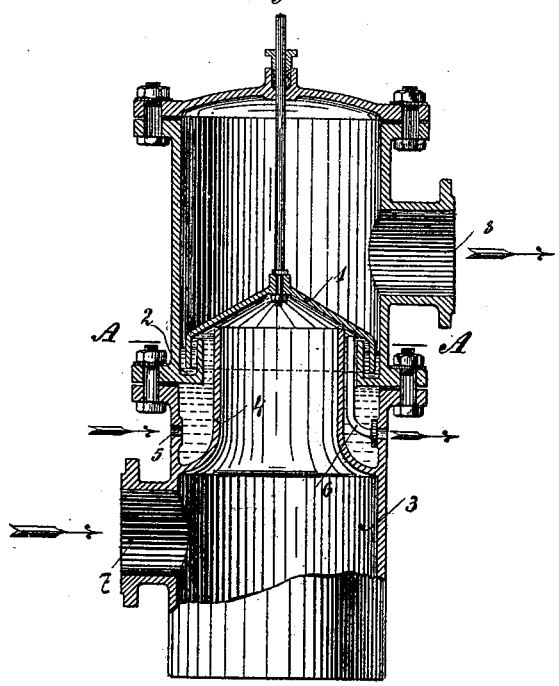
Figure 2:
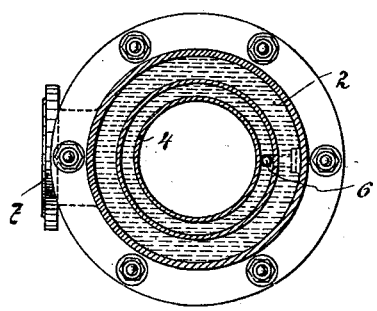

In order to render the present specification easily intelligible, reference is had to the accompanying drawings, in which a vertical section of the valve is represented in Figure 1, Fig. 2 being a horizontal section on line A A of Fig. 1.

Similar numerals of reference denote similar parts throughout both views.

According to the present invention the closure is not effected by contact of the surfaces of the valve and valve-housing, but by means of a sealing fluid, and in addition to the said sealing fluid a cooling fluid circulation is also provided for to prevent the vaporization of the sealing fluid owing to the great heat to which these valves are exposed. The valve-housing 3 is advantageously made in two parts superposed, the valve 1 being vertically adjustably mounted in a suitable stuffing box and gland in the cover of the upper portion, which also contains the outlet-pipe 8 for the gas or gases allowed to pass when the valve is open.

The valve 1 has the form of an inverted cup, the lower rim of which depends into an annular groove 2, formed in the housing, which groove is adapted to contain the quicksilver or other fluid effecting the closure. The lower part of the housing contains the gas-inlet to the valve, as indicated at 7, and is also provided with an upwardly-extending annular mouth 4, which is of such dimensions as to leave an annular passage for the cooling fluid around the passage or groove 2, containing the sealing fluid, the height of the said annular mouth being such as to allow the cooling fluid to overflow onto the upper surface of the sealing fluid from the inner rim of the channel of the same. The channel of the cooling fluid is provided with a cooling-fluid inlet 5 and overflow outlet-pipe 6 for the same. Thus it will be seen that whether the valve be closed or open the cooling fluid will always have access to the upper surface of the sealing fluid, and thus prevent the vaporization of the same.

I claim as my invention—

1. A valve for water-gas generators having a valve-housing, an inverted cup forming the valve proper, an annular chamber to carry a sealing fluid and into which the lower rim of said cup dips when the valve is closed, an upwardly-extending throat within said annular sealing-fluid chamber, to form with the valve-housing an annular cooling-chamber within the sealing-fluid chamber and means for circulating a cooling fluid within said cooling-chamber in the manner and for the purpose substantially as described.

2. A valve for water-gas generators, having a housing, a downwardly-turned cup to form the valve proper, an annular chamber having an upwardly-extending rim located beneath said cup when the valve is closed, said chamber containing the sealing fluid, and an interior throat extending upwardly through the space within the annular sealing-chamber and having its upper edge reaching above the rim of the sealing-chamber and means for supplying cooling fluid to the exterior of the said throat and for conducting off the said cooling fluid at a level above the rim of the sealing-fluid channel substantially as described.

In witness whereof I have hereunto set my hand in presence of two witnesses.

HUGO STRACHE.

Witnesses:
ALVESTO S. HOGUE,
AUGUST FUGGER.